No. 841,164. PATENTED JAN. 15, 1907.
L. D. MATTASSI.
HOOK AND LINK.
APPLICATION FILED NOV. 21, 1905.

WITNESSES
RS Dowrie
John A. Percival.

INVENTOR
Luige Domanico Mattassi
BY Richardson
ATTORNEYS

UNITED STATES PATENT OFFICE.

LUIGE DOMANICO MATTASSI, OF MELBOURNE, VICTORIA, AUSTRALIA.

HOOK AND LINK.

No. 841,164.   Specification of Letters Patent.   Patented Jan. 15, 1907.

Application filed November 21, 1905. Serial No. 288,472.

*To all whom it may concern:*

Be it known that I, LUIGE DOMANICO MATTASSI, a subject of the King of Italy, residing at 82 William street, Melbourne, in the State of Victoria, Australia, have invented certain new and useful Improvements in Hooks and Links; and I do declare the following to be a full, clear, and exact description of the invention, such as will enable others skilled in the art to which it appertains to make and use the same.

This invention has been devised to provide improvements in the construction of hooks and also in the construction of links in chains used for haulage; but the invention is also applicable to chains for various other purposes.

The object in the invention is to provide a safety connection between the hook and link so that the latter cannot come away from the former unless by a peculiar arrangement of the parts.

In order that my invention may be the more easily understood, reference may be made to the accompanying drawings, in which—

Figure 1:
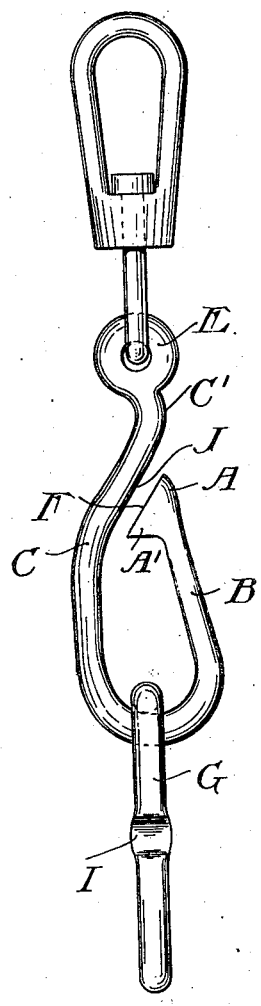
Figure 2:
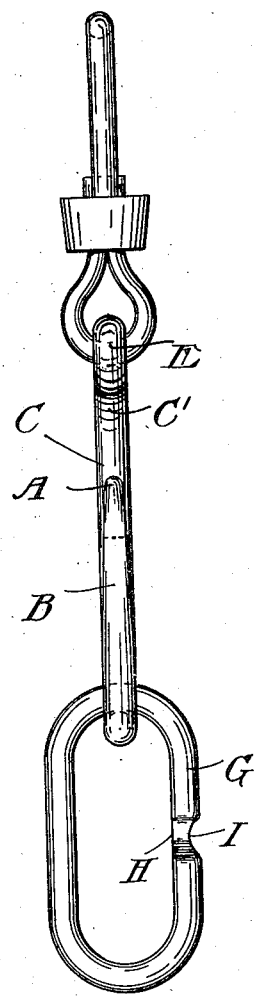

Figure 1 is a side elevation showing a link in position on a hook, both of which parts embody my invention, while Fig. 2 is a front view of same.

In the drawings, A represents the point of a hook B, which instead of turning outwardly, as usual, turns inwardly, so as to bring the pointed part A under and within a close distance of the main shank C of the hook below its eyelet E. The pointed portion A is cut off preferably flat at its face F. The link G is preferably oval in shape (see Fig. 2) and has a portion at H flattened on the inner side, but indented with a curved indentation I on the outer side. Such indentation is preferably formed by swaging upon an anvil when the link G is red-hot. Such indentation should be swaged, not cut; but as I have found that in swaging the metal outward from the indented part exterior curves or widened portions are formed which retain the strength of the link at that position. In putting the link G into the hook B the indented portion I is laid against the shank C of the hook at J and below the eyelet E, so that its inner or flattened portion H will slide along a correspondingly inner flat face F of the hook B, hereinbefore referred to. The link G on being pushed downward slides in between the flattened end F of the hook B and the shank C into the body or loop of the and the hook and is then ready for use. Should the link G through the working of the chain when in operation move or press upward, it is met and stopped by the inwardly-pointing end A' of the hook B and cannot become loosened from such hook. From the peculiar shape and setting of the shank of the hook at J and also the obstructive position of the point A' a bar is effectively produced against the escape of the link G until the latter has been carefully brought into exact position, as calculated, for withdrawal. When it is desired to remove the link G from its hook B, the former is moved so that it lies at right angles to the plane of the length of the latter. Its indented portion I may then be slid up the shank C at J toward the eyelet E. The flattened end F of the hook B and the flattened portion H of the inside of the link G will then touch one another and the link G can be freely withdrawn.

The top portion F of the point A of the hook B is formed inclined and is parallel to the shank C at C'. This is a very important item in the improvements, as the peculiar construction of the hook at those parts prevents any link of the chain from lodging on the top of A, the declivity of the latter causing the link to fall away should it touch that part, while the projecting part C' of the shank, which practically covers the top A, also wards off the link from catching thereon. Were this provision not made a link of the chain would sooner or later catch upon the hook near A and under the stress of tension would dilate the opening between F and C or might even break away the slender top of the hook.

Having thus described my invention, what I claim, and desire to secure by Letters Patent, is—

In combination, a hook having an eye E and a shank extending at an incline therefrom to a certain distance, the lower part of the shank being in the form of a U, the left arm of which is an extension of the inclined portion, the extreme end of the other arm of the U forming a point, said point being enlarged and having an inclined face which is parallel to the inclined portion of the shank whereby an inclined opening is formed between the point and shank and an oblong link having an indentation formed on one of
5 its sides so as to enable the link to pass through the said opening.

In testimony whereof I have signed my name to this specification in the presence of two subscribing witnesses.

LUIGE DOMANICO MATTASSI.

Witnesses:
CLAUDE D. RONALD,
A. BARTHOLEMEW.